UNITED STATES PATENT OFFICE.

PAUL ASKENASY, OF KARLSRUHE, GERMANY, ASSIGNOR TO AKTIENGESELLSCHAFT FÜR CHEMISCHE PRODUCTE VORMALS H. SCHEIDEMANDEL, OF BERLIN, GERMANY, A CORPORATION OF GERMANY.

SOLID GELATINOUS PRODUCT.

1,201,133.  Specification of Letters Patent.  Patented Oct. 10, 1916.

No Drawing.   Application filed October 19, 1915.  Serial No. 56,817.

*To all whom it may concern:*

Be it known that I, Dr. PAUL ASKENASY, professor, chemist, a subject of the German Emperor, and resident of Karlsruhe, Baden, Germany, have invented new and useful Solid Gelatinous Products, of which the following is a specification.

Gelatinous substances, such as glue, gelatin, and the like, are usually put on the market in a solid condition generally in the form of sheets or plates, or in the form of powder manufactured by grinding such sheets or plates. The sheets or plates themselves are generally obtained from solutions of the gelatinous substances.

My invention relates to a new gelatinous product in solid form and divided state, and I will describe the new product in describing the method of manufacturing it. This method consists in bringing the gelatinous material, when in a liquid state, in contact with a liquid which is unable to dissolve said gelatinous material. The effect of such treatment is that particles of gelatinous material, of substantially globular form are obtained; and these, under the conditions hereinafter stated, solidify and can be removed from the liquid, and the liquid may be used over and over again.

The solidified globules of gelatinous material, if containing solvents, for instance water, may be further treated so as to drive off the solvents from the gelatinous material, and to leave a hard product suitable for the market. One mode in which the method is employed includes the use of the liquid which does not dissolve gelatin, in a cooler state than the gelatinous material itself, and preferably at a temperature below the congealing point of the gelatinous material, so as to produce by direct contact with the liquid gelatinous material a quick congealing of same, at least at its surface. The cooling of the liquid in which the globules are formed, or into which the formed globules are introduced, may be effected continuously by proper means, for instance by circulation.

Suitable liquids that do not dissolve gelatin are benzene and other hydrocarbons, trichlorethylene, tetrachlorid of carbon, carbon-bisulfid, benzyl-alcohol, etc. Broadly speaking practically all liquids may be used which are insoluble, or almost insoluble in water, this depending upon the fact that the ordinary gelatinous materials, the use of which can be practicable commercially, are treated while in the form of aqueous solutions.

The size of the globules may be regulated at will, and depends generally on the velocity with which the gelatinous material is introduced, the pressure to which it is subjected, the diameter of the nozzles, and other conditions varying with the materials and temperatures employed. The cooling effect of the liquid brought into contact with the gelatinous globules depends principally on the differences in temperature and specific gravity between the two liquids employed. The nearer together the specific gravities, the slower is the movement of the globules through a column of liquid of a given height. If the specific gravity of the cooling liquid is smaller than that of the gelatinous substance, the globules sink to the bottom; whereas, in the reverse case, the globules rise to the top, or remain floating at the top.

Since the specific gravity of a substance depends also upon its temperature, it becomes possible to arrange conditions in such a way that the gelatinous globules, as long as they are comparatively warm, remain floating on the top of the cooling liquid, but sink to bottom when their specific gravity increases on cooling. This renders possible the use of a method wherein, by suitably controlling the specific gravity of the cooling liquid, for instance by the proper mixing of different liquids of different specific gravities, the globules of gelatinous material are kept floating at the top of the cooling liquid in the beginning of the process, and only sink to bottom when they are solid or at least solidified in the outer layers.

The method is applicable, not only for pure gelatinous material, but for mixtures of gelatinous material with other substances. Especially food preparations or medicines may be produced by using the new method in such a way that emulsions or solutions of eggs, blood, sugar, milk, flour, salts, medicines, etc., or the substances themselves, are incorporated into the gelatinous material, and thereafter introduced as a mixture into the cooling liquids. Also flavoring and coloring substances, or substances of other kinds, may be incorporated with gelatinous material, and brought into divided solid form by the method herein described.

As illustrative examples, I would suggest the following:

(1.) A solution of gelatin at 50° C. containing 20% of gelatin is dropped from a tinned copper nozzle of 0.7 mm. in diameter into tetrachlorid of carbon at 10° C., while the tetrachlorid of carbon is maintained at this temperature by cooling. It is surprising to see that the globules of the gelatinous material do not adhere together even if the tetrachlorid of carbon is not sufficiently cool to completely solidify the globules of the gelatinous material. The solidified globules are removed by a filter or in any other suitable manner. The adherent tetrachlorid of carbon is removed, for instance, by evaporating in vacuo, and may be recovered. The water can be removed from the globules of gelatin by evaporating in vacuo, or by drying the material in a stream of dry air, or in any other convenient way.

(2.) A solution of gelatin sweetened with sugar and perfumed and suitably colored is atomized by ejecting it from a suitable nozzle, and allowed to enter into cooled trichlorethylene. The small particles of gelatin, taking globular shape, form flour of gelatin, which may be continuously separated from the cooling liquid by filtration. The trichlorethylene still adhering to the gelatin flour may be regained as previously described. The atomized gelatinous material might either enter directly into the liquid or may pass at first through the air.

(3.) A solution of animal glue of 25% at a temperature of 50° C. is allowed to drop into a cooling liquid formed of a mixture of 170 parts of tetrachlorid of carbon and 100 parts of benzin; said cooling liquid being kept continuously at a temperature of about 10° C.

Depending upon the velocity with which the drops are introduced into the cooling liquid, and also depending upon the size of the aperture of the nozzle, globules of glue of different sizes and of substantially globular form are obtained, which, on entering the cooling liquid, float on or near the surface of the liquid, but sink to the bottom after some moments when they have nearly attained the temperature of the surrounding cooling liquid.

The duration of flotation of the globules on or near the surface of the cooling liquid, and the velocity of sinking down to the bottom, may be regulated at will by suitable variation of the components of the cooling mixture. This embodiment of the process is particularly suitable for obtaining large globules.

If the gelatin solution is allowed to fall down in larger drops from a greater height into the cooling liquid, or if a strong jet of gelatin solution is impinged on the surface of the cooling liquid, or injected into the liquid itself, a considerable proportion of very fine globules is produced, as well as larger globules. The several grades or sizes may be separated from each other by sifting, so that a plurality of grades of material according to variable fineness is obtained. The sifting of the material is advisable in most cases because the globules formed may differ somewhat from each other in size, although it is surprising to see that, under proper conditions, the size of the several globules is nearly uniform. Instead of injecting the gelatin solution into the cooling liquid, or instead of impinging it on the surface of the cooling liquid, its introduction into the cooling liquid may be also effected by centrifugal force. For instance, the gelatinous material may be introduced into a centrifugal drum the wall of which is formed by a filtering cloth, and such drum may be put into rotation within the cooling liquid. Under the influence of centrifugal force, the contents of the drum pass through the meshes of the filtering cloth and, in finely divided form, enter the cooling liquid, and form therein solid globular particles.

The new product can be manufactured by means of small and cheap apparatus, in large quantities, at low expense, and in a short time. In the manufacture of gelatinous products or glue, the gelatin or glue solution coming from the evaporating apparatus may be treated in the above described manner with the result that the expensive and bulky drying devices hitherto used may be dispensed with.

The globules of gelatin and glue may be gathered up and packed, and shipped much more conveniently than the thin sheets hitherto used.

The regular form of the gelatinous particles produced by this process allows easy ascertaining of the purity of the product without difficult analysis. In this way adulterations of the material may be effectively discovered and prevented, because it would be practically impossible to secure adulterating material of the same shape and appearance as that given to the gelatinous globules by the process of this invention.

I claim as my invention.

1. As a new article of manufacture a solid animal gelatinous product consisting of small particles of substantially globular shape.

2. As a new article of manufacture a solid gelatinous product consisting of small particles of substantially globular shape containing non-gelatinous material and animal gelatinous material.

3. As a new article of manufacture a solid food preparation in a divided condition the elements of same consisting of small globules containing a food substance mixed with an animal gelatinous substance.

In testimony, that I claim the foregoing as my invention, I have signed my name in presence of two witnesses, this fifteenth day of September 1915.

Dr. PAUL ASKENASY, Professor.

Witnesses:
    Henry Hasper,
    Lilli Frank.